US005923024A

United States Patent [19]
Wray

[11] Patent Number: 5,923,024
[45] Date of Patent: Jul. 13, 1999

[54] APPARATUS AND METHODS FOR CONTROLLING SENSOR SIGNAL HYSTERESIS

[75] Inventor: Donald L. Wray, Ocala, Fla.

[73] Assignee: Angstrom Technologies, Inc., Erlanger, Ky.

[21] Appl. No.: 08/938,926

[22] Filed: Oct. 2, 1997

[51] Int. Cl.$^6$ ........................................... G06K 7/10
[52] U.S. Cl. .......................... 235/462.25; 235/462.01
[58] Field of Search .................. 235/462.25, 462.01, 235/462.02, 462.26, 462.27, 462.28, 462.29

[56] References Cited

U.S. PATENT DOCUMENTS

| | | | |
|---|---|---|---|
| 4,677,315 | 6/1987 | Blauschild et al. | 327/205 |
| 4,756,557 | 7/1988 | Kaule et al. | 283/85 |
| 4,908,516 | 3/1990 | West | 250/556 |
| 5,030,833 | 7/1991 | Nozaka et al. | 250/461.1 |
| 5,225,811 | 7/1993 | Audy | 340/584 |
| 5,404,054 | 4/1995 | Kotowski | 327/73 |
| 5,408,694 | 4/1995 | Turo | 327/2 |
| 5,418,855 | 5/1995 | Liang et al. | 380/23 |
| 5,548,106 | 8/1996 | Liang et al. | 235/454 |
| 5,574,790 | 11/1996 | Liang et al. | 380/23 |
| 5,610,545 | 3/1997 | Jenkins et al. | 327/205 |
| 5,617,050 | 4/1997 | Jenkins et al. | 327/205 |

FOREIGN PATENT DOCUMENTS 08316798  11/1996  Japan ............................... H03K 5/08

OTHER PUBLICATIONS

Author unknown "Peak Detector" IBM Tech. Discl. Bulletin, Jan. 1973, p. 2377.
Author unknown "Digital Feedback Light Emitting Diode Control" IBM Tech. Discl. Bulletin, Jan. 1974, pp. 2598–2600.
Author unknown "Intelligent Receiver with Multiple Hysteresis Levels" IBM Tech. Discl. Bulletin, v. 37 No. 11, Nov. 1994, pp. 249–250.

*Primary Examiner*—Thien Minh Le
*Attorney, Agent, or Firm*—Theodore R. Touw

[57] ABSTRACT

Apparatus for producing an output signal responsive to a sensor signal having a unit for setting desired hysteresis values and desired reference values of the sensor signal, a unit for detecting whether the sensor signal has a positive or negative slope with respect to time, a unit for triggering one logical signal when the sensor signal has a positive slope and also exceeds one reference value minus a first hysteresis value, and a unit for triggering another logical signal when the sensor signal has a negative slope and also falls below the sum of a second reference value and a second hysteresis value. The apparatus and method may have more than two reference values and/or more than two hysteresis values simultaneously. The apparatus may be implemented by an embedded microcomputer of conventional type, programmed to perform the signal-processing disclosed. The steps of the process and initial values of the reference values and hysteresis values may be stored in a read-only memory. The method for controlling an output signal responsive to a sensor signal includes steps of setting first and second hysteresis values, setting first and second reference values of the sensor signal, detecting whether the sensor signal has a positive or negative slope with respect to time, triggering a first logical signal when the sensor signal has a positive slope and also exceeds the first reference value minus the first hysteresis value, and triggering a second logical signal when the sensor signal has a negative slope and also falls below the sum of the second reference value and the second hysteresis value. Both reference values and hysteresis values are preferably made programmable by a user. When more than two reference values and/or more than two hysteresis values are used simultaneously, each of those values is programmable.

27 Claims, 6 Drawing Sheets

APPARATUS AND METHODS FOR CONTROLLING SENSOR SIGNAL HYSTERESIS

FIELD OF THE INVENTION

This invention relates generally to digital signal processing, and more particularly to apparatus and methods for programmable control of hysteresis of a sensor signal.

BACKGROUND OF THE INVENTION

In machines using sensors, it is often necessary to trigger an output upon the sensor signal's crossing a certain level. A simple example is the reading of bar codes using an optical sensor. If the background of a particular bar code varies in reflectivity, or if the illumination varies during the scanning of the bar code, for example, a system with a single fixed trigger level or even a single programmable trigger level can be subject to false triggering or "jitter," causing a false reading of the bar code. Other sources of noise can also contribute to false triggering and resultant reading errors.

NOTATIONS AND NOMENCLATURE

The term "hysteresis" as used in this specification and the appended claims means a tolerance with respect to a trigger level at which an output signal is generated in response to a sensor signal. Thus, if the sensor signal is a voltage or can be converted to a voltage, the hysteresis may be expressed in volts, or millivolts, etc. Of course, this is not the same as a tolerance defined for desired or permissible values of the sensor signal itself.

DESCRIPTION OF THE RELATED ART

Problems similar to the false triggering described above have sometimes been solved using hardware hysteresis control. For example, the article, "Peak Detector"(IBM Technical Disclosure Bulletin, January 1973, p. 2377), describes a peak detector circuit that can detect successive peaks of varying absolute amplitude, using a resistor to introduce hysteresis for improving noise rejection. The article, "Digital Feedback Light Emitting Diode Control" (IBM Technical Disclosure Bulletin, January 1974, pp. 2598–2600), describes a circuit for automatically compensating for loss of efficiency in both an LED and a photodetector and for temperature variations, by adjusting the level of LED bias current to provide a pulsing source of current to the LED, which is centered at the minimum threshold current level necessary to activate the detector. The repetition rate of the detector output is determined by the hysteresis of the detector as well as by the RC time constants in the circuit. The article, "Intelligent Receiver with Multiple Hysteresis Levels"(IBM Technical Disclosure Bulletin, vol. 37, no. 11, November 1994, pp. 249–250), describes a dual threshold receiver that automatically selects a hysteresis level based on an algorithm that is applied to a received waveform. The input signal is applied to three analog comparators, each with a different hysteresis level. The digital outputs are analyzed by a digital algorithm circuit which applies a criterion used to select a multiplexer path to connect a selected digital waveform to the data output. U.S. Pat. No. 5,225,811 to Audy describes a temperature limit circuit with dual hysteresis, using a pair of comparators for producing an output signal when a sensed temperature either exceeds or falls below a permissible range.

U.S. Pat. No. 5,404,054 to Kotowski describes a method and apparatus for controlling programmable or dynamic hysteresis. In Kotowski's method and circuit, the hysteresis "decay pattern," the rate of decay, and the minimum separation between a high switchpoint and a low switchpoint are all programmable. Kotowski's circuit uses one or more comparators and digital-to-analog converters (DAC) controlled by digital logic, depending on the number of switchpoints. U.S. Pat. Nos. 5,610,545 and 5,617,050 to Jenkins et al. respectively describe a method and a circuit for providing programmable hysteresis levels, using a programmable hysteresis input for adjusting the hysteresis differential to different preset and intermediate hysteresis levels.

The related art includes a number of such examples of hardware hysteresis control or programmable dynamic hysteresis for threshold detection, all of which undoubtedly perform their intended functions satisfactorily. However, none of the related art provides simple programmable control of hysteresis of an arbitrarily varying analog sensor signal which has been converted to a digital signal form as, for example, by an analog-to-digital converter commonly used in sensor applications. None of the related art has provided programmable control of hysteresis with multiple simultaneous programmable thresholds.

PROBLEMS SOLVED BY THE INVENTION

Sensor applications often include a sensor capable of high frequency operation and related circuitry. The circuitry may include an integrator with a time constant, which improves signal to noise ratio, but an integrator can reduce overall high frequency response of the system if the time constant is made relatively long. It is often desired to trigger an output signal when the sensor signal reaches a predetermined threshold value or drops below a predetermined threshold value. If the time constant is reduced, extraneous, relatively high-frequency noise in the sensor signal can combine with the relatively low-frequency signal proper that it is desired to detect. When the noise occurs on rising or falling edges of the desired signal, false triggering can occur due to the noise. The present invention prevents such false triggering without requiring undue sacrifice of sensor frequency response, and it allows hysteresis to be controlled in a simply programmable manner. For some applications, multiple simultaneous thresholds are needed, and the present invention provides for multiple simultaneous programmable thresholds without requiring additional hardware, such as an additional comparator, for each additional threshold added.

OBJECTS AND ADVANTAGES OF THE INVENTION

One object of the invention is providing programmable digital control of hysteresis of a sensor signal. Another object is improving the reliability of triggering of an output responsive to a sensor signal. A related object is preventing false triggering or jitter without the need to reduce sensor sensitivity or frequency response. Another related object is improving the noise immunity of signals responsive to the output of a sensor. Particular objects are providing improved methods and apparatus for control of sensor signal hysteresis. Another particular object is providing multiple simultaneous programmable thresholds without requiring additional hardware, such as an additional comparator, for each additional threshold added. More particular objects include providing apparatus and methods adaptable to provide improved reading of bar codes or other indicia having backgrounds of non-uniform or varying illumination, color, transparency, refractive index, fluorescence, or reflectivity.

SUMMARY OF THE INVENTION

Apparatus for producing an output signal responsive to a sensor signal has means for setting desired hysteresis values and desired reference values of the sensor signal, means for detecting whether the sensor signal has a positive or negative slope with respect to time, means for triggering one logical signal when the sensor signal has a positive slope and also exceeds one reference value minus a first hysteresis value, and means for triggering another logical signal when the sensor signal has a negative slope and also falls below the sum of a second reference value and a second hysteresis value. The apparatus and method may have more than two reference values and/or more than two hysteresis values simultaneously. The apparatus may be implemented by an embedded computer, such as a microcomputer of conventional type, programmed to perform the signal-processing process disclosed herein. The steps of the signal-processing process may be stored in an embedded read-only memory. Initial values of the reference values and hysteresis values may also be stored in an embedded read-only memory. The method for controlling an output signal responsive to a sensor signal includes the steps of setting desired first and second hysteresis values, setting desired first and second reference values of the sensor signal, detecting whether the sensor signal has a positive or negative slope with respect to time, triggering a first logical signal when the sensor signal has a positive slope and also exceeds the first reference value minus the first hysteresis value, and triggering a second logical signal when the sensor signal has a negative slope and also falls below the sum of the second reference value and the second hysteresis value. In both the apparatus and the method, both reference values and both hysteresis values are preferably made programmable by a user. When more than two reference values and/or more than two hysteresis values are used simultaneously, each of those values is programmable.

DETAILED DESCRIPTION OF THE PREFERRED EMBODIMENTS

Copyrighted materials

A portion of the disclosure of this patent document contains material that is subject to copyright protection. The copyright owner has no objection to the facsimile reproduction by anyone of the patent disclosure, as it appears in the U.S. Patent and Trademark Office files or records, but otherwise reserves all copyright rights whatsoever.

Figure 1:
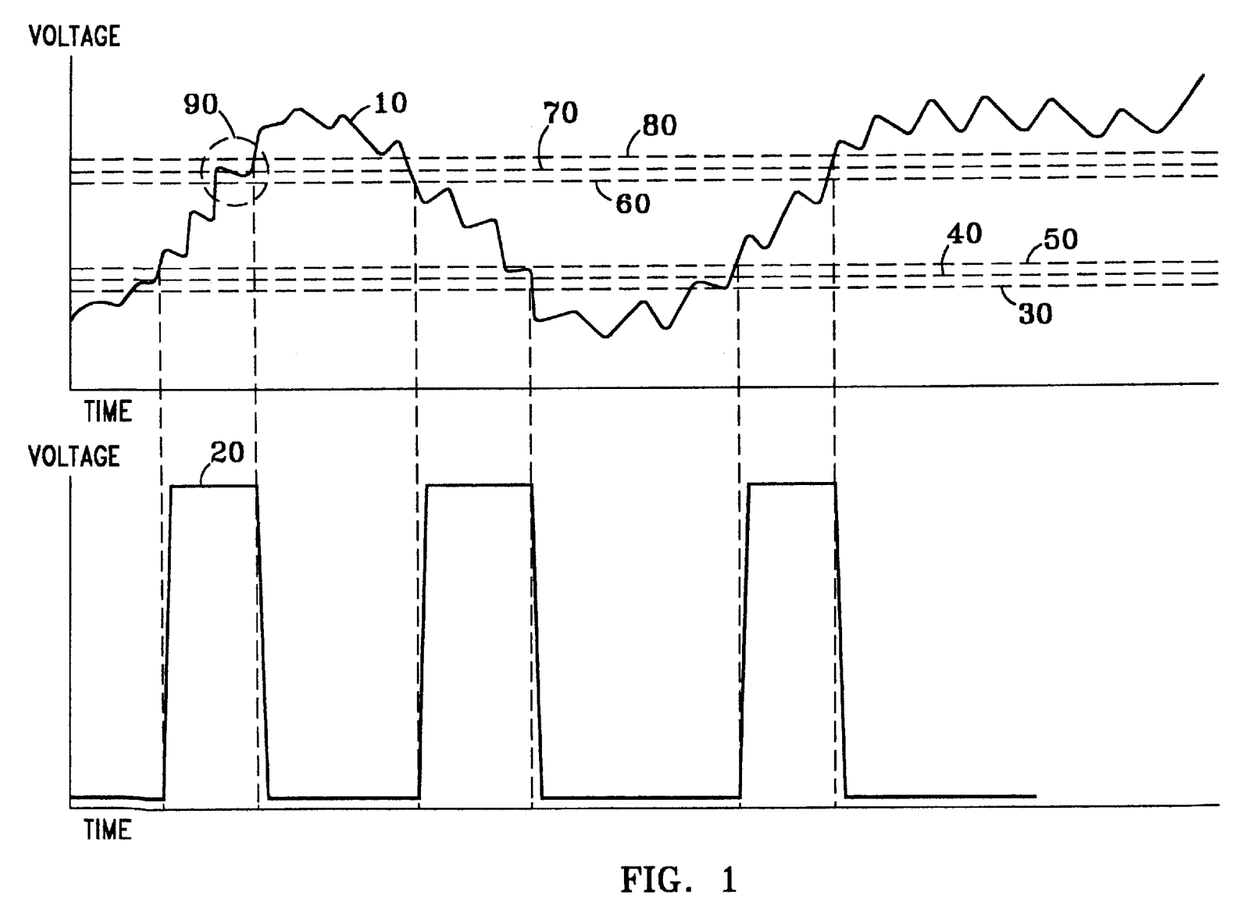
FIG. 1 shows an anslog signal susceptible to processing by apparatus made in accordance with the invention.
Figure 2:
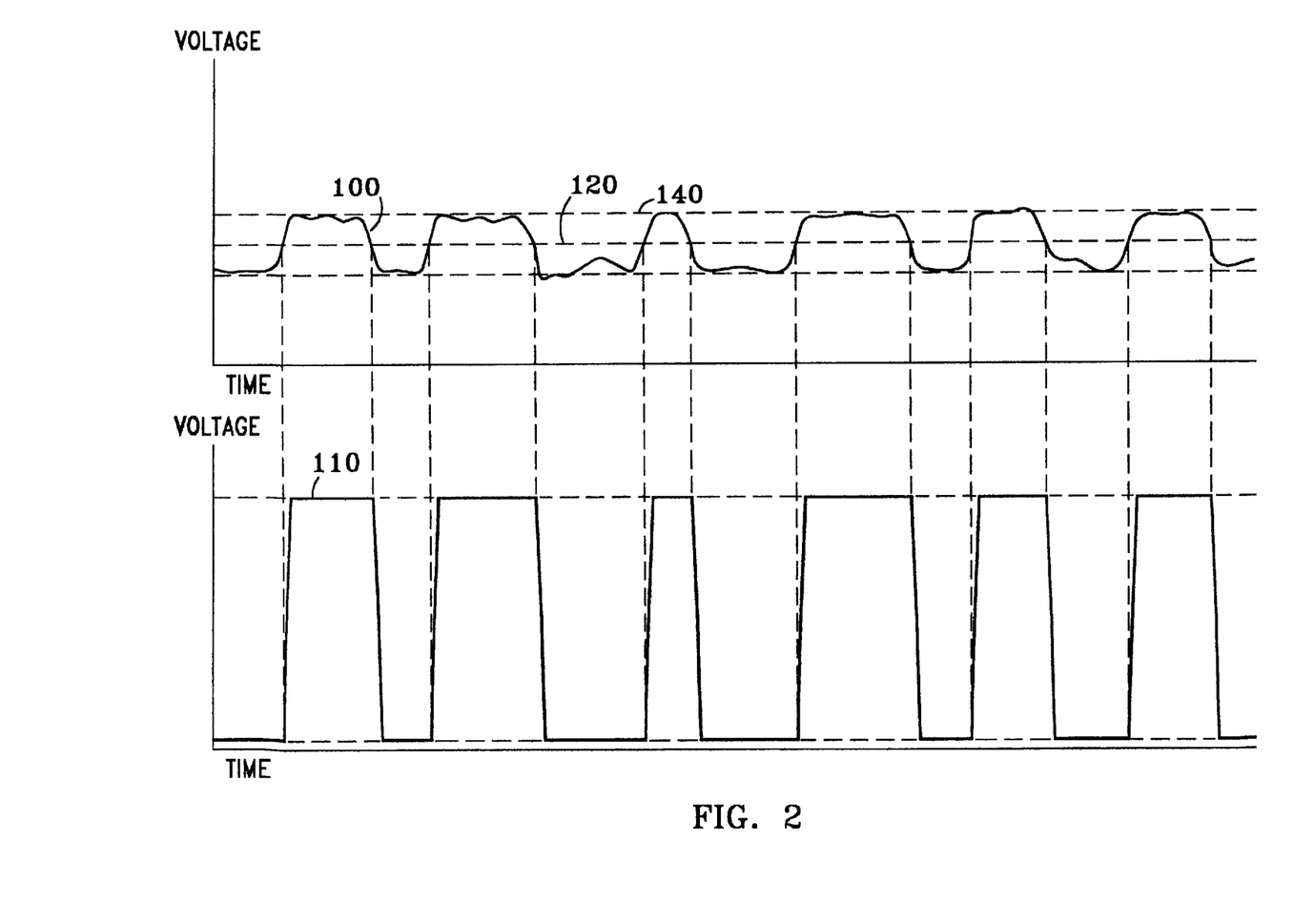
FIG. 2 shows an analog signal for a typical bar code with negligible variation in background signal and good signal-to-noise ratio.
Figure 3:
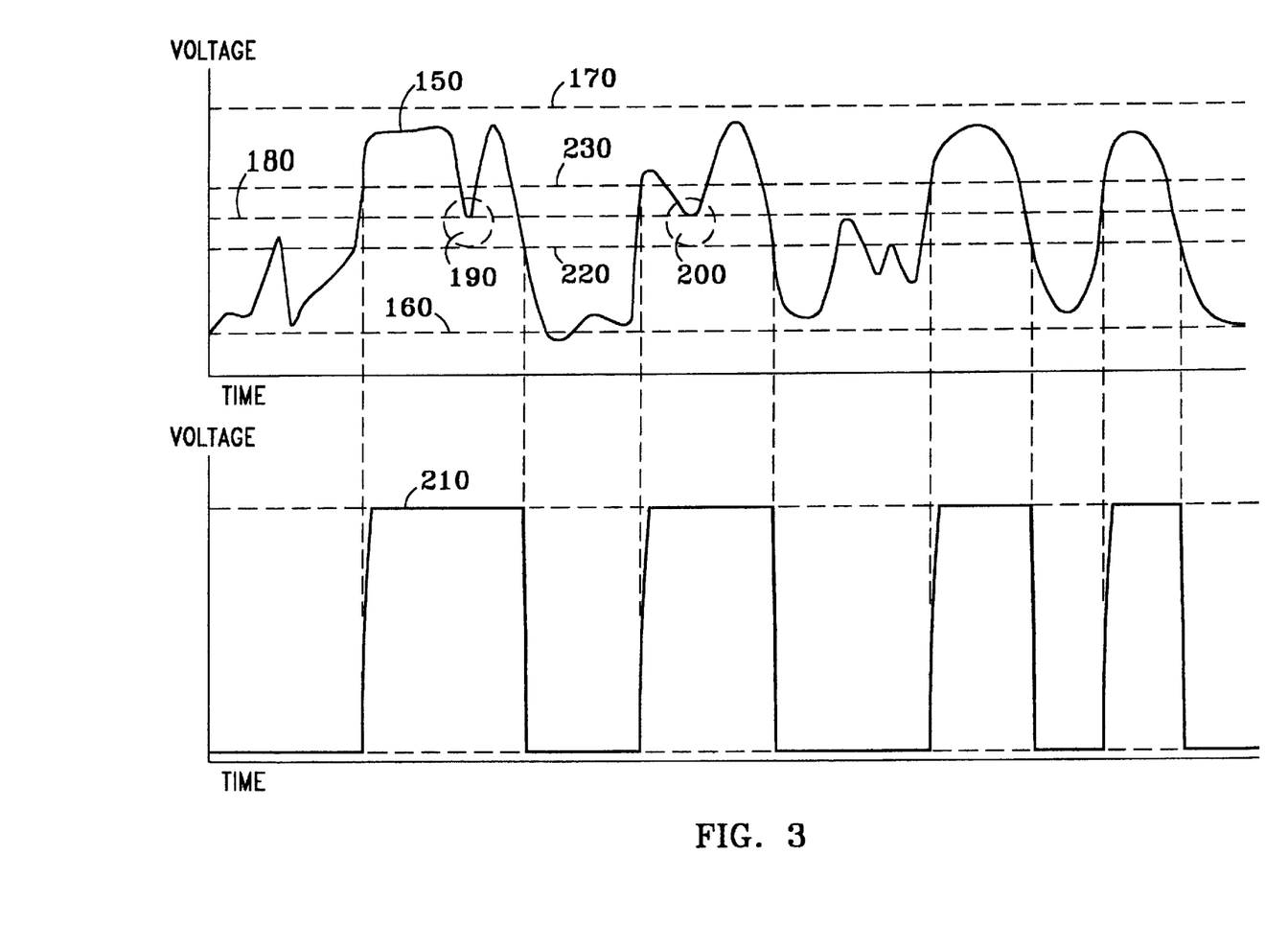
FIG. 3 shows an analog signal for a typical bar code with negligible variation in background signal and poor signal-to-noise ratio.
Figure 4:
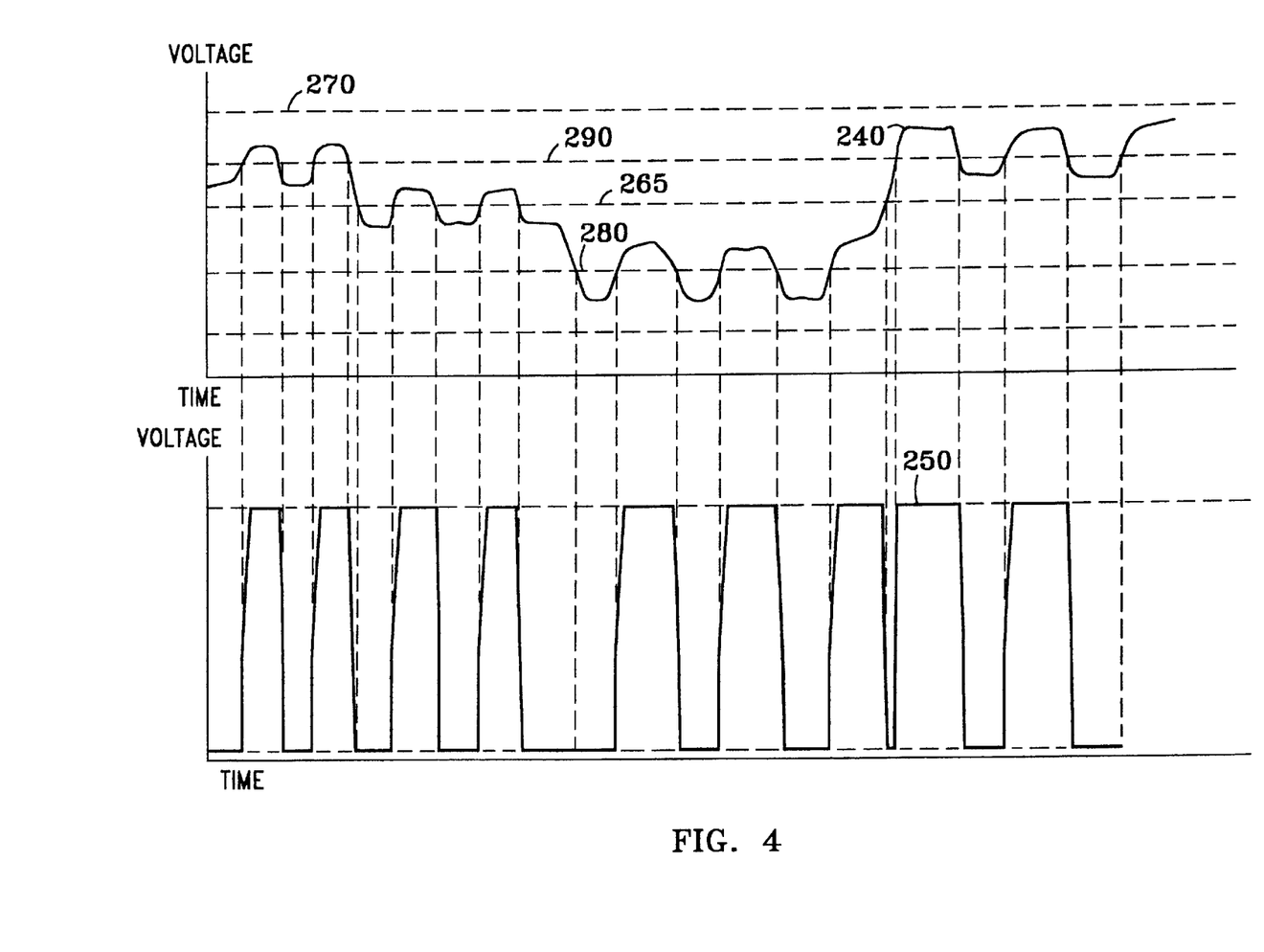
FIG. 4 shows an analog signal for a typical bar code with non-negligible variation in background signal and good signal-to-noise ratio.

FIGS. 1–4 illustrate various possible sensor-signal situations that can occur in practice. FIG. 1 shows an analog signal 10 susceptible to processing by apparatus made in accordance with the invention, and an output signal 20 provided by apparatus made in accordance with the invention. The dotted horizontal lines 30, 40, 50, 60, 70, and 80 in FIG. 1 are explained hereinbelow. The portion of analog signal 10 marked with a circle 90 would cause a false output signal in the absence of hysteresis control. FIG. 2 shows an analog signal 100 for a typical bar code with negligible variation in background signal and good signal-to-noise ratio, and an output signal 110 derived from analog signal 100 by detecting the sensor signal's crossings of threshold voltage 120, set between the low voltage 130 and the high voltage 140 of sensor analog signal 100. Such a signal is relatively easy to decode. To obtain a decodable signal, the apparatus determines the range between low level 130 and high level 140, and sets the threshold level 120 within that range between them (e.g. midway between 130 and 140). FIG. 3 shows an analog sensor signal 150 for a typical bar code with negligible variation in background signal, but poor signal-to-noise ratio. Analog signal 150 varies between a low level (160) and a high level (170). If the same approach were taken as was used for FIG. 2, a threshold level 180 would be set between 160 and 170. However, there are potential problem areas of signal 150 (circled at 190 and 200), where the signal crosses threshold level 180 due to noise fluctuations, which would cause false triggering of the output signal at 190 and 200. Control signal 210 in FIG. 3 is derived from analog signal 150 using hysteresis control, in which low hysteresis level 220 and high hysteresis level 230 shown in FIG. 3 are set by a predetermined ratio based on the difference between low signal level 160 and high signal level 170. Transitions of output signal 210 are triggered by high hysteresis level 230 when signal 150 is rising (positive slope) and by by low hysteresis level 220 when signal 150 is falling (negative slope). If background compensation is also required, the hysteresis levels can be adjusted with time, as determined by keeping track of a running average of low value 160 and a running average of high value 170. FIG. 4 shows an analog sensor signal 240 for a bar code with non-negligible variation in background signal and good signal-to-noise ratio. Output signal 250 in FIG. 4 is determined in the same manner as in FIG. 3, using analog signal low level 260, high level 270, nominal threshold 265, low hysteresis level 280 and high hysteresis level 290. If the background variation is as shown in FIG. 4, some states cannot be decoded. In order to get consistent decoding, the background must vary slowly in comparison to the bar and space frequencies, and/or the bar and space signal amplitude must exceed the background variation amplitude.

Returning to FIG. 1, the levels marked with horizontal dotted lines are identified as follows: a low hysteresis level 30 and high hysteresis level 50 are set about CAL-LO reference level 40; a low hysteresis level 60 and high hysteresis level 80 are set about CAL-HI reference level 70. Output signal 20 is triggered when sensor signal 10 crosses high hysteresis level 50 while rising, when sensor signal 10 crosses high hysteresis level 80 while rising, when sensor signal crosses low hysteresis level 60 while falling, and when sensor signal 10 crosses low hysteresis level 30 while falling.

The preferred embodiments of the invention will be described first in terms of the methods used in the invention, and then in terms of the apparatus implementing those methods. The overall method of the invention for controlling hysteresis of an output signal responsive to a sensor signal involves both hysteresis values and reference values of the sensor signal.

Multiple reference values (e.g. more than two) and multiple hysteresis values may be used and can be very useful for some applications. For example, a single bar code may have two or more different backgrounds of different color or reflectivity. Particular instances of this problem occur when a bar code is printed over a multicolored background, or when an accidental smudge darkens the background of a portion of a bar code, while having a negligible effect on the printed bars themselves. In some methods and apparatus of the prior art, providing multiple reference values and/or multiple hysteresis values would require adding hardware, such as an additional hardware comparator for each added threshold value. As will be clear from the following description, adding additional reference values and/or hysteresis values can be accomplished in the present invention by programming, without added hardware. The additional reference values and/or hysteresis values may be made simultaneously effective, since the sensor signal is converted to digital form, and multiple simultaneous comparisons can be made without introducing significant delays. For clarity and simplicity of exposition, the following description is expressed in terms of only two reference values and two hysteresis values.

Figure 5:
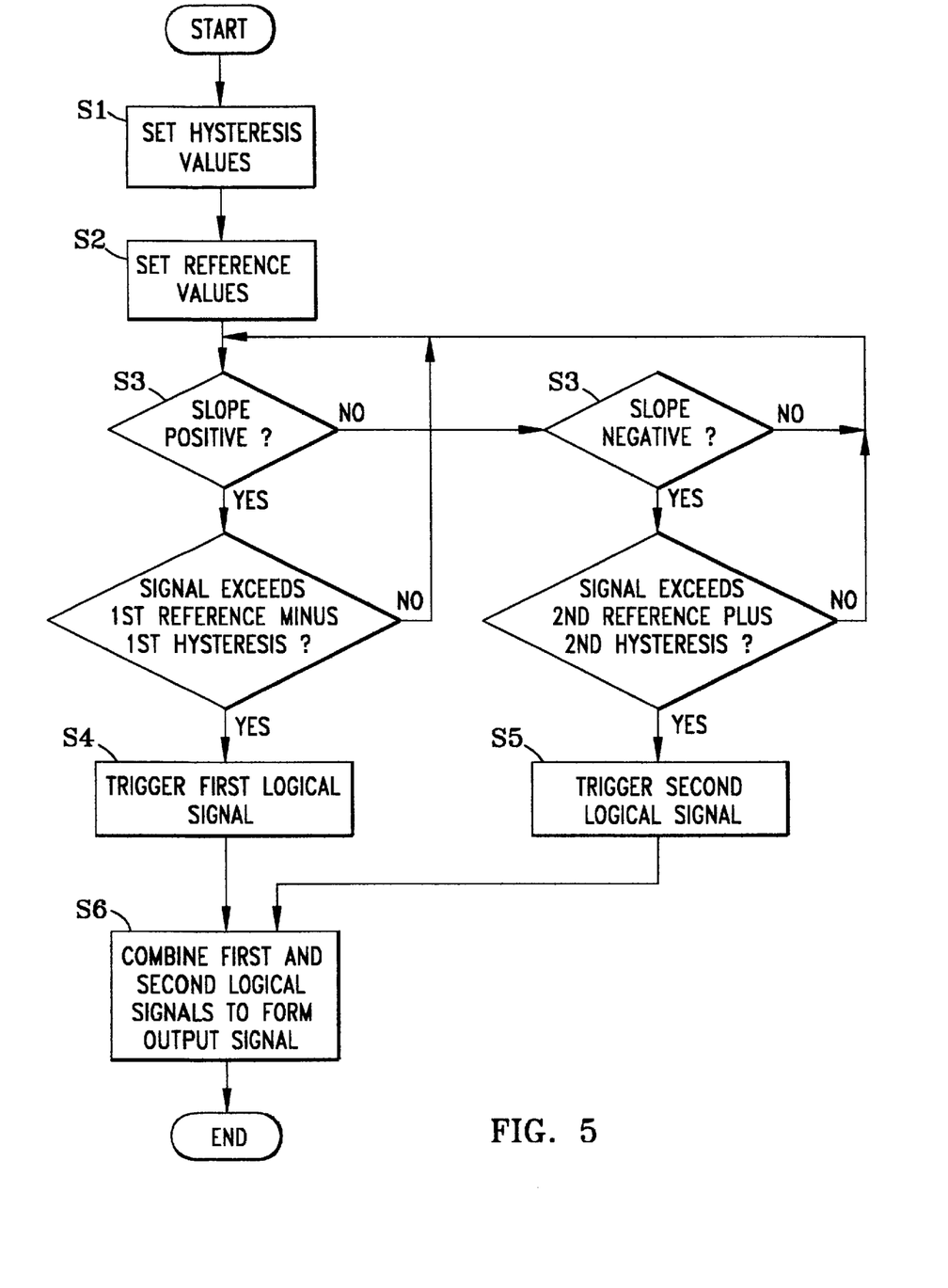
FIG. 5 shows a flow chart illustrating a method performed in accordance with the invention.

The overall method of the invention for controlling hysteresis of an output signal responsive to a sensor signal is shown in FIG. 5. Steps of the process are denoted by references S1, S2, . . . , S6. The method includes the steps of setting desired hysteresis values (S1), setting desired reference values of the sensor signal (S2), detecting whether the sensor signal has a positive or negative time slope (S3), triggering a certain logical signal (S4) when the sensor signal has a positive slope and also exceeds a predetermined reference value minus a first hysteresis value, and triggering another logical signal (S5) when the sensor signal has a negative slope and also falls below the sum of a second predetermined reference value and a second hysteresis value. An output signal is gated (S6) according to a predetermined logical combination of the two logical signals. Computer instructions (source code) to implement a specific simple example of the method on a digital microprocessor type of computer is listed in the Appendix below. The example shown in the Appendix is expressed in instructions for a Motorola MC68HC7 microprocessor. The first and second reference values of the sensor signal may be chosen to be equal. Similarly, the hysteresis values may be the same or may be different from each other, depending on the application. The example shown in the Appendix uses a single hysteresis value (R_HVAL). Those skilled in the art will be able, without substantial experimentation, to express methods equivalent to that shown in the Appendix by using other instruction sets for similar microprocessors, or by using higher level languages, and/or using other known computer processors.

Figure 6:
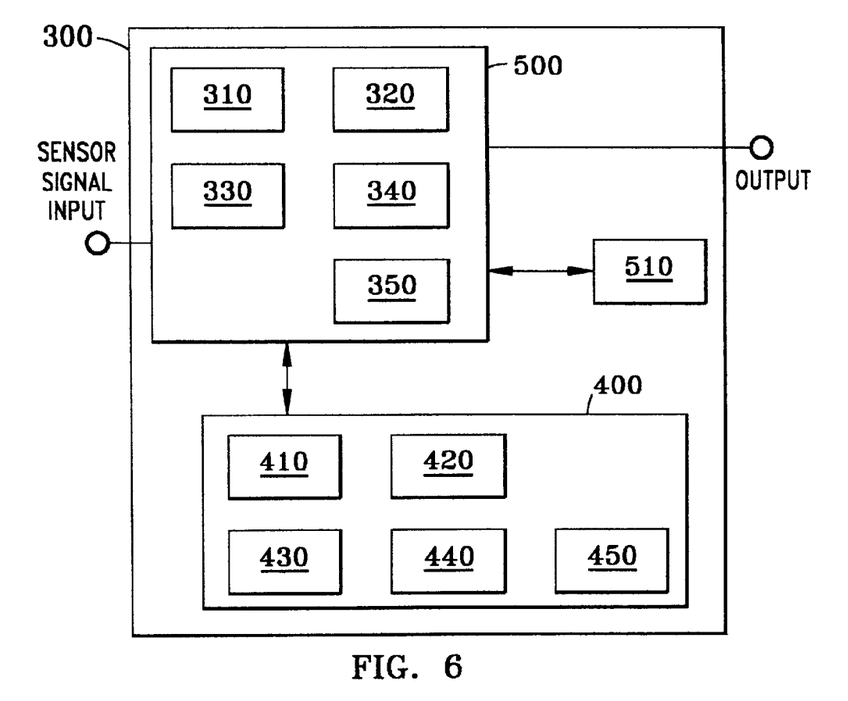
FIG. 6 shows apparatus made in accordance with the invention for implementing the method of FIG. 5.

FIG. 6 shows apparatus made in accordance with the invention for implementing the method of FIG. 5. In general the system (generally denoted by reference numeral 300) for automatically controlling hysteresis of a sensor signal in accordance with the invention has means 310 for setting desired predetermined hysteresis values, means 320 for setting desired predetermined reference values of the sensor signal, means 330 for detecting whether the sensor signal has a positive or negative slope with respect to time, means 340 for triggering a logical signal when the sensor signal has a positive slope and also exceeds one predetermined reference value minus a first hysteresis value, and means 350 for triggering another logical signal when the sensor signal has a negative slope and also falls below the sum of a second predetermined reference value and a second hysteresis value. The system has a memory 400, and portions (410, 420) of the memory are used for storing digital representations of the desired hysteresis values, while other portions (430, 440) of the memory are used for storing digital representations of the desired w reference values. The system preferably includes a user-programmable microprocessor 500 for modifying the digital representations of the desired reference values and the desired hysteresis values, and for performing the comparisons and logical decisions outlined above in the description of the methods of the invention. As is known in the art, the microprocessor 500 may be pre-programmed for a particular sensor application, and the program of microprocessor instructions, along with the initial parameter values or "constants" such as reference values and hysteresis values, may be stored in a read-only memory 510 or in a portion 450 of memory 400. In this type of application, the microprocessor is commonly referred to as an "embedded controller." System 300 may also include conventional inputs and outputs, such as a keyboard, display, etc. (not shown), and other conventional features as required by the application.

Figure 7:
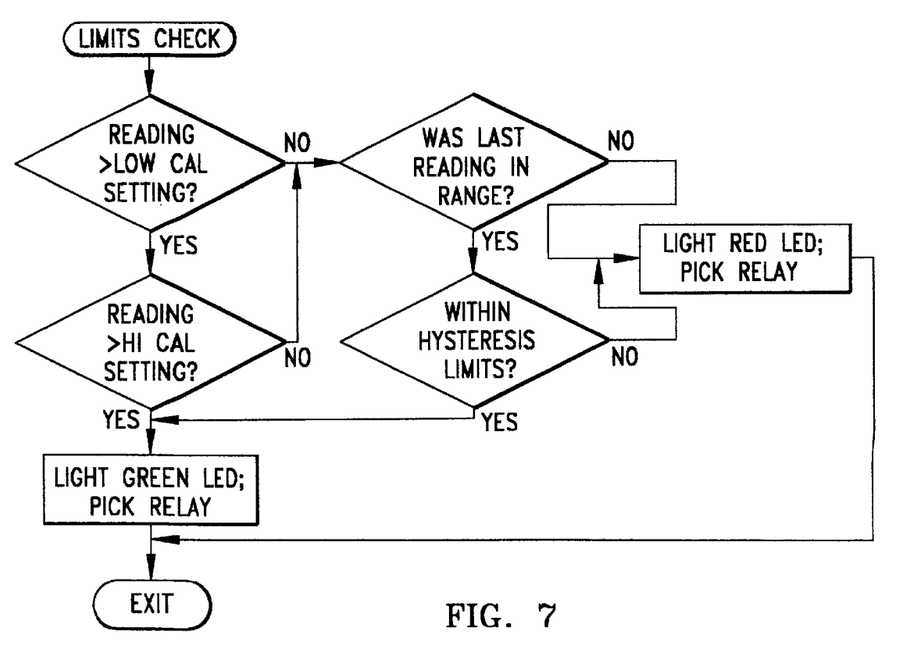
FIG. 7 shows a flow chart illustrating a particular method performed in accordance with the invention.

FIG. 7 shows a flow chart illustrating a particular simplified method performed in accordance with the invention. The sequence of operations depicted in FIG. 7 is suitable for sensor signal situations similar to that shown in FIG. 2.

The invention will be further clarified by considering the following example, which is intended to be purely exemplary of the use of the invention. Hysteresis control using the methods and apparatus of the present invention may be usefully employed in an authentication system such as any of the systems described in U.S. Pat. Nos. 5,418,855, 5,548,106, and 5,574,790 to Liang et al., all assigned to the same assignee as the present invention. The entire disclosure of each of these patents is incorporated herein by reference. In one embodiment in U.S. Pat. No. 5,418,855, for example, the primary sensor is a photodetector such as a PIN photodiode, whose analog output is amplified, filtered, and synchronously detected, using a lock-in amplifier, amplified by a buffer amplifier, and fed to an analog-to-digital converter (ADC). The digital signal may be processed by the methods and apparatus disclosed herein to produce output signals responsive to the sensor analog signal. The ADC may have an output of eight bits, for example, or any number of bits depending on the desired resolution. If one bit of resolution of an eight bit ADC is 20 mV, for example, and the hysteresis limits in millivolts are set at 0 mV, 40 mV, 80 mV, and 160 mV, then the hysteresis limits correspond to 0, 2, 4, and 8 bits of ADC resolution. The output signals can include logical signals indicating reliably whether the current analog sensor signal is within a desired or acceptable range bounded by low and high calibration limits of the authentication apparatus, and whether the hysteresis is within acceptable limits. Logical signals provided by the apparatus may be used to operate relays that control other apparatus, and/or the logical signals may be used to control indicators such a light-emitting diodes (LEDs) to indicate to a user the outcome of the signal-processing. As is known in the art, control relays may be electromagnetic relays, solid-state relays, or any conventional type of actuator, and these may be electrically isolated from the apparatus of the invention by the use of transformers, capacitors, optical couplers, or the like, as appropriate to the particular application.

From the foregoing description of particular embodiments, one skilled in the art can easily ascertain the essential characteristics of this invention, and without departing from the spirit and scope thereof, can make various changes and modifications of the invention to adapt it to various usages and conditions. Other embodiments of the invention will be apparent to those skilled in the art from a consideration of this specification or from practice of the invention disclosed herein. For example, the apparatus and methods may be adapted to provide improved reading of one- or two-dimensional bar codes, matrix codes, OCR-readable characters, or other indicia having backgrounds of non-uniform or varying illumination, color, transparency, refractive index, fluorescence, or reflectivity. It is intended that the specification and examples be considered as exemplary only, with the true scope and spirit of the invention being defined by the appended claims and their legal equivalents.

Having described my invention, I claim:

1. Apparatus for producing an output signal responsive to a sensor signal, comprising:
   a) means for setting a first number of desired hysteresis values,
   b) means for setting a second number of desired reference values of said sensor signal,
   c) means for detecting whether sad sensor signal has a positive or negative slope with respect to time,
   d) means for triggering at least one first logical signal when said sensor signal has a positive slope and exceeds a selected first at least one of said reference values minus a selected first at least one of said hysteresis values, and

APPENDIX TO THE SPECIFICATION

```
***************************************************************************
        LDA     CUR_READ    ; Get current sensor reading
        LSRA                ; Make positive divided by 2 (relaxes tolerance)
        BEQ     L10         ; Exactly 0
*                           ; tolerance and simplifies math
        SUB     LOW_CAL     ; Subtract LOW_CAL
        BPL     L20         ; Reading above lower limit
*
*   Reading is at or below LOW_CAL
*
L10     EQU     *
        LDA     LAST_RD     ; See what the last state was
        BEQ     L15         ; If zero then reading was not within range
*                           ; so no need to check for hysteresis
*                           ; otherwise something was read and in range so
        LDA     CUR_READ    ; Get current sensor reading again
        LSRA                ; Make positive divided by 2
        ADD     R_HVAL      ; Add in hysteresis now
        SUB     LOW_CAL     ; Subtract LOW_CAL again
        BPL     L30         ; Reading is within hysteresis limit
*                           ; BR = Indicate the reading is within range
                            ; else, the reading went below the threshold
L15     EQU     *
        LDA     #$FF        ; Set condition for below CAL-LOW
        JMP     LIM_EXIT    ; Return
*
*   Test for reading above the high calibration level
*
L20     EQU     *
        LDA     CUR_READ    ; Get current sensor reading
        LSRA                ; Make positive and divide by 2
        SUB     HIGH_CAL    ; Subtract HIGH_CAL
        BLS     L30         ; BR if reading is at or below high range
*
*   Reading is above the high range
*
        LDA     LAST_RD     ; See what the last state was
        BEQ     L25         ; If zero then the reading was not in range
*                           ; previously -- no need to test for hysteresis
        LDA     CUR_READ    ; Get current sensor reading again
        LSRA                ; Make positive divided by 2
        SUB     R_HVAL      ; Subtract hysteresis and
        SUB     HIGH_CAL    ; subtract HIGH_CAL
        BLS     L30         ; BR if reading is at or below high range
*
L25     EQU     *
        LDA     #$FF        ; Set condition for out of range
        JMP     LIM_EXIT    ; Return
L30     EQU     *
*
*   Reading is within range
*
        CLRA                ; Set condition for good read
*
        LIM_EXIT EQU        *
        RTS                 ; Return
***************************************************************************
``` e) means for triggering at least one second logical signal when said sensor signal has a negative slope and falls below the sum of a selected second at least one of said reference values and a selected second at least one of said hysteresis values.

2. Apparatus as recited in claim 1, wherein said selected first and second at least one of said reference values of said sensor signal are equal.

3. Apparatus as recited in claim 1, wherein said selected first and second at least one of said hysteresis values are equal.

4. Apparatus as recited in claim 1, wherein said means for setting said first number of desired hysteresis values includes memory means for storing digital representations of said desired hysteresis values.

5. Apparatus as recited in claim 1, wherein said means for setting said second number of desired reference values of said sensor signal includes memory means for storing digital representations of said desired reference values.

6. Apparatus as recited in claim 1, further comprising a control output for controlling external apparatus, said control output being responsive to a predetermined combination of said at least one first logical signal and said at least one second logical signal.

7. Apparatus as recited in claim 1, further comprising indicator means responsive to a predetermined combination of said at least one first logical signal and said at least one second logical signal.

8. A barcode reader comprising apparatus as recited in claim I and further comprising a photodetector for providing said sensor signal.

9. An authentication system comprising apparatus as recited in claim 1 and further comprising a photodetector for providing said sensor signal.

10. Apparatus as recited in claim 4, wherein said means for setting said first number of desired hysteresis values includes programmable means for modifying said digital representations of said desired hysteresis values.

11. Apparatus as recited in claim 5, wherein said means for setting said second number of desired reference values includes programmable means for modifying said digital representations of said desired reference values.

12. Apparatus for producing an output signal responsive to a sensor signal, comprising:
   a) means for setting desired first and second hysteresis values,
   b) means for setting desired first and second reference values of said sensor signal,
   c) means for detecting whether said sensor signal has a positive or negative slope with respect to time,
   d) means for triggering a first logical signal when said sensor signal has a positive slope and exceeds said first reference value minus said first hysteresis value, and
   e) means for triggering a second logical signal when said sensor signal has a negative slope and falls below the sum of said second reference value and said second hysteresis value.

13. Apparatus as recited in claim 12, wherein said first and second reference values of said sensor signal are equal.

14. Apparatus as recited in claim 12, wherein said first and second hysteresis values are equal.

15. Apparatus as recited in claim 12, wherein said means for setting desired first and second hysteresis values includes memory means for storing digital representations of said desired hysteresis values.

16. Apparatus as recited in claim 12, wherein said means for setting desired first and second reference values of said sensor signal includes memory means for storing digital representations of said desired reference values.

17. Apparatus as recited in claim 12, further comprising a control output for controlling external apparatus, said control output being responsive to a predetermined combination of said first and second logical signals.

18. Apparatus as recited in claim 12, further comprising indicator means responsive to a predetermined combination of said first and second logical signals.

19. Apparatus as recited in claim 15, wherein said means for setting desired first and second hysteresis values includes programmable means for modifying said digital representations of said desired hysteresis values.

20. Apparatus as recited in claim 16, wherein said means for setting desired first and second reference values includes programmable means for modifying said digital representations of said desired reference values.

21. A reader for producing an output signal responsive to indicia, comprising:
   a) photodetector means disposed to receive light from said indicia, said photodetector means producing an analog signal;
   b) scanning means disposed for illuminating said indicia;
   c) means for setting desired first and second hysteresis values;
   d) means for setting desired first and second reference values of said analog signal;
   e) means for detecting whether said analog signal has a positive or negative slope with respect to time;
   f) means for triggering a first logical signal when said analog signal has a positive slope and exceeds said first reference value minus said first hysteresis value;
   g) means for triggering a second logical signal when said analog signal has a negative slope and falls below the sum of said second reference value and said second hysteresis value; and
   h) decoding means for decoding said indicia, said decoding means being responsive to said first and second logical signals.

22. A method for controlling an output signal responsive to a sensor signal, comprising the steps of:
   a) setting a first number of desired hysteresis values,
   b) setting a second number of desired reference values of said sensor signal,
   c) detecting whether said sensor signal has a positive or negative slope with respect to time,
   d) triggering at least one first logical signal when said sensor signal has a positive slope and exceeds a selected first at least one of said reference values minus a selected first at least one of said hysteresis values,
   e) triggering at least one second logical signal when said sensor signal has a negative slope and falls below the sum of a selected second at least one of said reference values and a selected second at least one of said hysteresis values, and
   f) gating said output signal according to a predetermined logical combination of said at least one first and said at least one second logical signals.

23. A method as recited in claim 22, further comprising the step of energizing an indicator in accordance with said output signal.

24. A method as recited in claim 22, further comprising the step of energizing a control relay in accordance with said output signal.

25. A method for controlling an output signal responsive to a sensor signal, comprising the steps of:
   a) setting desired first and second hysteresis values,
   b) setting desired first and second reference values of said sensor signal,
   c) detecting whether said sensor signal has a positive or negative slope with respect to time,
   d) triggering a first logical signal when said sensor signal has a positive slope and exceeds said first reference value minus said first hysteresis value,
   e) triggering a second logical signal when said sensor signal has a negative slope and falls below the sum of said second reference value and said second hysteresis value, and
   f) gating said output signal according to a predetermined logical combination of said first and second logical signals.

26. A method as recited in claim 25, further comprising the step of energizing an indicator in accordance with said output signal.

27. A method as recited in claim 25, further comprising the step of energizing a control relay in accordance with said output signal.

* * * * *